United States Patent
Komatsu et al.

[11] Patent Number: 5,995,049
[45] Date of Patent: Nov. 30, 1999

[54] RADAR MODULE AND ANTENNA DEVICE

[75] Inventors: Satoru Komatsu; Masanobu Urabe, both of Saitama-ken, Japan

[73] Assignee: Honda Giken Kogyo Kabushiki Kaisha, Tokyo, Japan

[21] Appl. No.: 08/927,994

[22] Filed: Sep. 12, 1997

Related U.S. Application Data

[62] Division of application No. 08/611,665, Mar. 6, 1996, Pat. No. 5,724,042.

[30] Foreign Application Priority Data

Mar. 23, 1995 [JP] Japan .................................. 7-090252
Aug. 24, 1995 [JP] Japan .................................. 7-239311

[51] Int. Cl.[6] .................................................. H01Q 1/38
[52] U.S. Cl. .................................. 343/700 MS; 343/850; 343/853
[58] Field of Search ................ 343/700 MS, 853, 343/850; 342/175, 70, 71, 72; H01Q 1/38

[56] References Cited

U.S. PATENT DOCUMENTS

| | | | |
|---|---|---|---|
| 4,933,680 | 6/1990 | Shapiro et al. | 343/700 MS |
| 5,206,655 | 4/1993 | Caille et al. | 343/700 MS |
| 5,264,860 | 11/1993 | Quan | 343/767 |
| 5,333,002 | 7/1994 | Gans et al. | 343/700 MS |
| 5,381,157 | 1/1995 | Shiga | 343/895 |
| 5,508,706 | 4/1996 | Tsou et al. | 342/192 |
| 5,657,024 | 8/1997 | Shingyoji et al. | 342/175 |
| 5,686,923 | 11/1997 | Schaller | 342/352 |
| 5,724,042 | 3/1998 | Komatsu et al. | 342/175 |
| 5,742,254 | 4/1998 | Bassaler | 343/700 MS |

FOREIGN PATENT DOCUMENTS

| | | |
|---|---|---|
| 0 531 877 A1 | 3/1993 | European Pat. Off. . |
| 0 611 969 A1 | 8/1994 | European Pat. Off. . |
| 43 07 009 A1 | 9/1993 | Germany . |
| 57-003061 | 1/1982 | Japan . |
| 02-176489 | 7/1990 | Japan . |
| 03-054494 | 3/1991 | Japan . |
| 03-078679 | 4/1991 | Japan . |
| 05-067919 | 3/1993 | Japan . |
| 05-212440 | 8/1993 | Japan . |
| 06-300834 | 10/1994 | Japan . |
| 08-250913 | 9/1996 | Japan . |

OTHER PUBLICATIONS

Fan Beam Generated by a Linear–Array Fed Parabolic Reflector, Huang, J. et al., IEEE Transactions on Antennas and Propagation, vol. 38, No. 7, Jul. 1990.

Mclivenna, "Monolithic Phased Arrays for EHF Communications Terminals", Microwave Journal (Mar. 1988), pp. 113–117,121, 122, 124, 125.

Primary Examiner—Hoanganh Le
Attorney, Agent, or Firm—Lyon & Lyon LLP

[57] ABSTRACT

A radar module has an antenna assembly, a plurality of transmitting and receiving assemblies, and a plurality of circulators all mounted on a dielectric substrate. The antenna assembly has a plurality of transmitting and receiving channels including respective planar array antenna elements each composed of a plurality of patches connected to and spaced along a linear distal end portion of a feeder line. The planar array antenna elements are arrayed in a direction substantially perpendicular to the linear distal end portion of the feeder line. The transmitting and receiving assemblies, implemented as monolithic microwave integrated circuits, selectively transmit high-frequency signals to the planar array antenna elements and selectively receive echo signals from the planar array antenna elements. The circulators are associated with the transmitting and receiving channels, respectively, and connect the respective linear distal end portions of the feeder lines to transmission and reception end portions which are connected to the transmitting and receiving assemblies, respectively.

2 Claims, 5 Drawing Sheets

RADAR MODULE AND ANTENNA DEVICE

This is a divisional of application Ser. No. 08/611,665, filed on Mar. 6, 1996, now U.S. Pat. No. 5,724,042.

BACKGROUND OF THE INVENTION

1. Field of the Invention

The present invention relates to a radar module and an antenna device for an FM millimeter-wave radar alarm system for use on motor vehicles.

2. Description of the Prior Art

One known motor vehicle radar alarm system has an electronically scanning planar antenna array as disclosed in U.S. Pat. No. 5,008,678. The disclosed electronically scanning planar antenna array comprises a plurality of transmitting and receiving planar antenna elements, a pair of passive phased arrays such as planar microstrip Butler matrixes, and a pair of electronic switches which are combined to transmit and receive a scanning beam.

The conventional electronically scanning planar antenna array is disadvantageous in that the passive phased arrays thereof cannot scan a relatively large angular range with the scanning beam. Another problem is that the planar antenna array requires both a transmitting array of antenna elements dedicated to transmitting radar signals and a receiving array of antenna elements dedicated to receiving echo signals. This imposes limitations on conventional systems which make it difficult to reduce the size of the planar antenna arrays used therein and, especially difficult to install such planar antenna arrays on motor vehicles.

German laid-open publication No. 4307009 discloses an antenna device for a radar module.

IEEE TRANSACTIONS ON MICROWAVE THEORY AND TECHNIQUES, VOL. MTT-26, NO. 1, January 1978, shows an MIC Doppler module with output radiation normal to the substrate plane.

Japanese patent publication No. 57-24968 discloses a microwave IC case.

Japanese laid-open utility model publication No. 1-126714 discloses an antenna device.

SUMMARY OF THE INVENTION

It is an object of the present invention to provide a radar module and an antenna device which are capable of scanning a relatively large angular range with a scanning beam and which are of a small size suitable for use particularly on motor vehicles.

According to one aspect of the present invention, there is provided a radar module comprising a dielectric substrate, an antenna assembly mounted on the dielectric substrate, the antenna assembly comprising a plurality of transmitting and receiving channels including respective planar array antenna elements each composed of a plurality of patches connected to and spaced along a linear distal end portion of a feeder line, the planar array antenna elements being arrayed in a direction substantially perpendicular to the linear distal end portion of the feeder line, a plurality of transmitting and receiving assemblies mounted as monolithic microwave integrated circuits on the dielectric substrate, for selectively transmitting high-frequency signals to the planar array antenna elements and selectively receiving echo signals from the planar array antenna elements, and a plurality of circulators mounted on the dielectric substrate and associated with the transmitting and receiving channels, respectively, the circulators connecting the respective linear distal end portions of the feeder lines to transmission and reception end portions which are connected to the transmitting and receiving assemblies, respectively.

The antenna assembly serves as a primary radiator of a defocused multiple-beam antenna. The planar array antenna elements are arranged to radiate respective electromagnetic waves at a predetermined tilt angle, the offset multiple-beam antenna having a secondary radiator positioned closely to the primary radiator.

According to another aspect of the present invention, there is also provided a radar module comprising a dielectric substrate, a plurality of planar array antenna elements mounted in respective channels on the dielectric substrate, and a plurality of monolithic microwave integrated circuits mounted on the dielectric substrate, the monolithic microwave integrated circuits including a plurality of transmitting assemblies for amplifying and supplying respective high-frequency signals to the planar array antenna elements, respectively, and a plurality of receiving assemblies for receiving echo signals from the planar array antenna elements and mixing the echo signals with amplified local signals related to the high-frequency signals.

In each of the above radar modules, the planar array antenna elements are divided into two groups, the planar array antenna elements of one of the two groups and the planar array antenna elements of the other of the two groups being arranged in an interdigitating pattern and disposed on respective linear distal end portions of feeder lines belonging to the respective groups and extending in opposite directions that are 180° apart from each other.

Alternatively, the planar array antenna elements may be divided into two groups, the planar array antenna elements of one of the two groups and the planar array antenna elements of the other of the two groups being disposed on respective linear distal end portions of feeder lines belonging to the respective groups and extending in opposite directions that are 180 apart from each other, and being positioned substantially in an end-to-end configuration and staggered with respect to each other in a direction across the feeder lines.

The high-frequency signals transmitted to the planar array antenna elements comprise frequency-modulated signals, the receiving assemblies including mixers for mixing echo signals from the planar array antenna elements with the frequency-modulated signals to thereby produce beat signals.

The transmitting assemblies include transmission amplifiers for amplifying the high-frequency signals, and the receiving assemblies include reception amplifiers for amplifying the local signals. A control circuit is provided for selectively operating the transmission amplifiers and the reception amplifiers.

According to still another aspect of the present invention, there is also provided an antenna device comprising a dielectric substrate, an array of antenna elements mounted on the dielectric substrate, each of the antenna elements comprising a plurality of patches interconnected in a direction transverse to the array, and a plurality of circulators mounted on the dielectric substrate and connected in series to the antenna elements, respectively.

The circulators are arranged in adjacent pairs, the circulators in each of the pairs being arranged such that DC magnetic fields in mutually opposite directions are applied to the circulators, respectively, for rotating signals in mutually opposite directions in the circulators.

The antenna device further comprises a scanning control circuit for switching the antenna elements in a time-sharing fashion.

According to still another aspect of the present invention, there is provided an antenna device comprising a dielectric substrate, a primary radiator comprising an array of antenna elements mounted on the dielectric substrate, each of the antenna elements comprising a plurality of patches interconnected in a direction transverse to the array, and a plurality of circulators mounted on the dielectric substrate and connected in series to the antenna elements, respectively, a secondary radiator for reflecting a beam radiated from the antenna elements, and a holder supporting the primary radiator integrally with the secondary radiator, with the primary radiator being positioned substantially at a focal point of the secondary radiator.

The above and other objects, features, and advantages of the present invention will become apparent from the following description when viewed in conjunction with the accompanying drawings which illustrate, by way of example, preferred embodiments of the present invention.

DETAILED DESCRIPTION OF THE PREFERRED EMBODIMENTS

Figure 1:
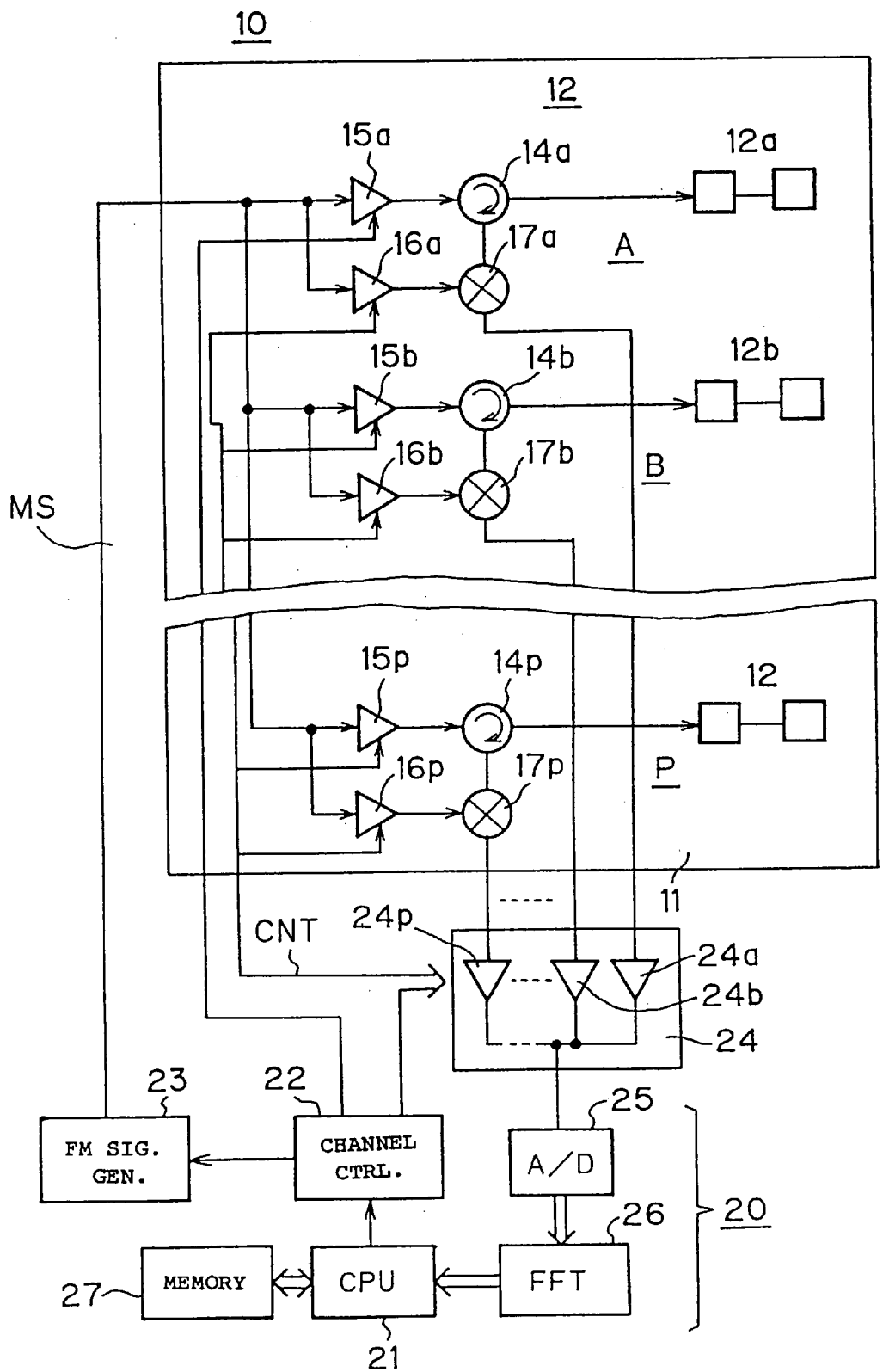
FIG. 1 is a block diagram of an FM radar system which incorporates an FM radar module according to an embodiment of the present invention.

FIG. 1 shows in block form an FM radar system which incorporates an FM radar module according to an embodiment of the present invention.

As shown in FIG. 1, the FM radar system generally comprises an FM radar module 10 and a main radar circuit 20. The FM radar system is preferably installed on a motor vehicle (not shown).

The FM radar module 10 comprises a dielectric substrate 11 having an antenna assembly 12 mounted thereon. The antenna assembly 12 comprises a plurality (16 in the illustrated embodiment) of transmitting and receiving channels A~P disposed on the dielectric substrate 11. The transmitting and receiving channels A~P comprise respective small-size planar array antenna elements $12a$~$12p$ and respective transmitting and receiving assemblies. The small-size planar array antenna elements $12a$~$12p$ are shared by the transmitting and receiving assemblies through respective circulators $14a$~$14p$ which are connected in series with the planar array antenna elements $12a$~$12p$, respectively. The transmitting assemblies include respective selective transmission amplifiers $15a$~$15p$, and the receiving assemblies include respective selective reception amplifiers $16a$~$16p$ and respective mixers $17a$~$17p$. The transmitting and receiving channels A~P receive FM (frequency-modulated) signals to be transmitted which are supplied from an FM signal generator 23 in the main radar circuit 20 through a microstrip line MS.

The main radar circuit 20 comprises a CPU (central processing unit) 21, a channel controller 22, an FM signal generator 23, a selector 24, an A/D (analog-to-digital) converter 25, an FFT (fast Fourier transform) circuit 26, and a memory 27.

Figure 2:
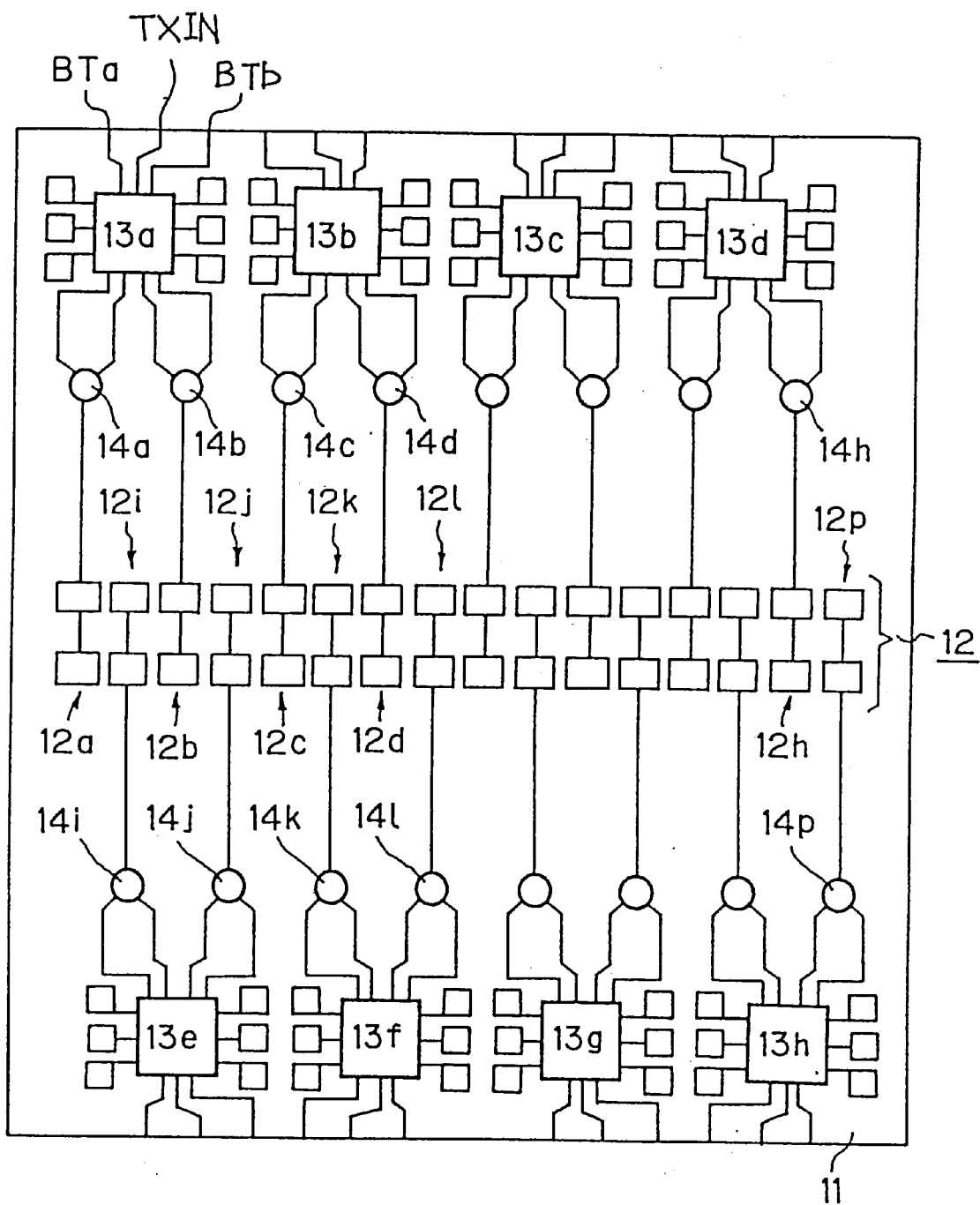
FIG. 2 is a plan view of the physical structure of the FM radar module shown in FIG. 1.

The FM radar module 10 shown in FIG. 1 has the physical structure illustrated in FIG. 2. The dielectric substrate 11, which is housed in a metallic casing, is made of highly pure alumina ceramic having a relative dielectric constant of 9.7, and supports thereon a plurality of (8 in the illustrated embodiment) MMICs (monolithic microwave integrated circuits) $13a$~$13h$.

In order for the FM radar module 10 to provide an installation space for the 16 circulators $14a$~$14p$ which are relatively large in size, the 16 planar array antenna elements $12a$~$12p$ and the corresponding transmitting and receiving channels A~P including the circulators $14a$~$14p$ are divided into two groups. Specifically, the 16 planar array antenna elements $12a$~$12p$ are divided into a group of eight planar array antenna elements $12a$~$12h$ and a group of eight planar array antenna elements $12i$~$12p$. The eight planar array antenna elements $12a$~$12h$ of one group and the eight planar array antenna elements $12i$~$12p$ of the other group are arranged in interdigitating pattern and disposed on respective linear distal end portions of feeder lines belonging to the respective groups and extending in opposite directions that are 180° apart from each other. The planar array antenna elements $12a$~$12h$ are arrayed in a direction perpendicular to the linear distal end portions of the feeder lines.

Figure 3:
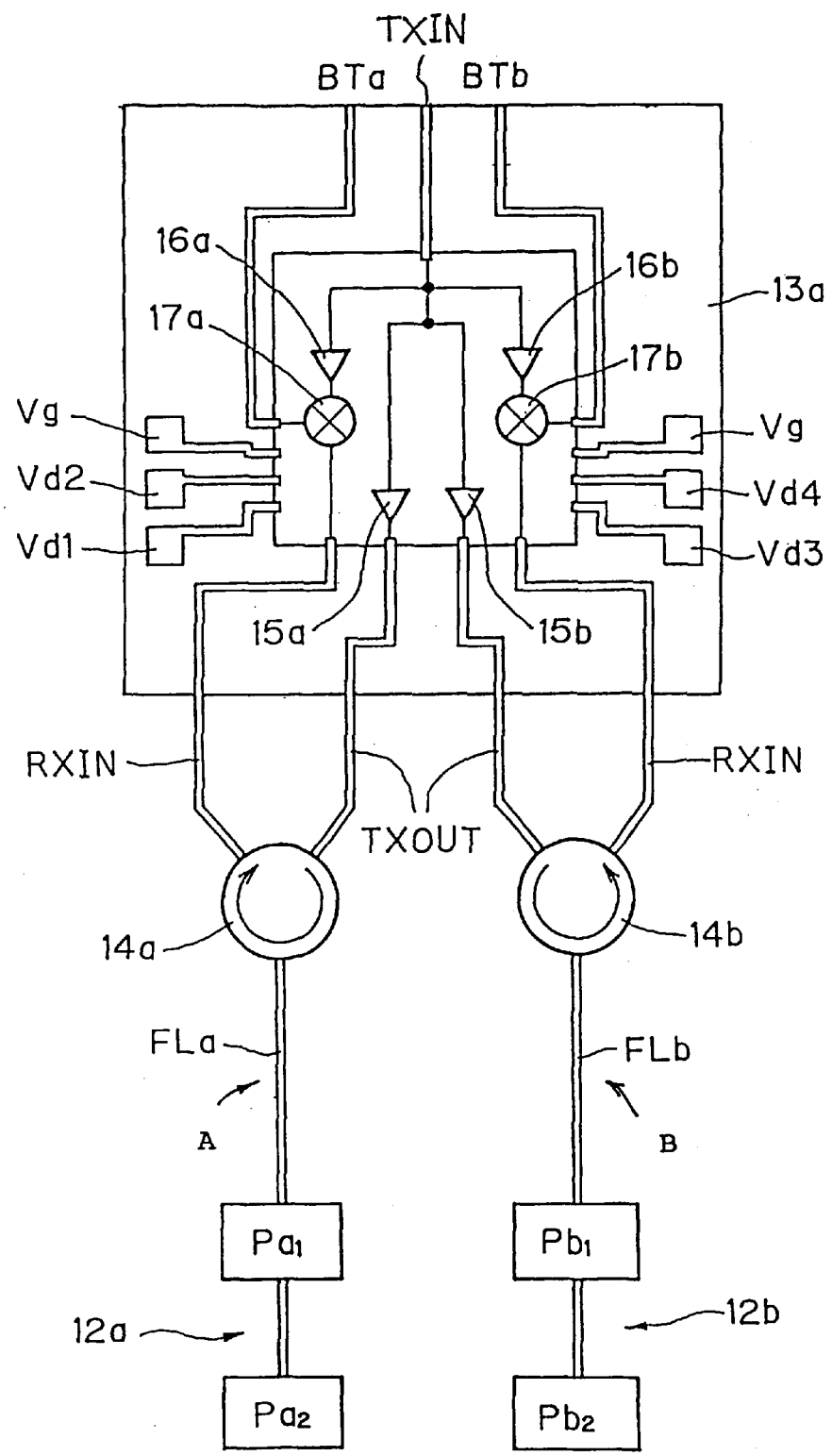
FIG. 3 is an enlarged plan view of one unit of transmitting and receiving channels of the FM radar module shown in FIG. 2.

Each of the eight MMICs $13a$~$13h$ is composed of the transmitting and receiving assemblies of two adjacent transmitting and receiving channels of the 16 transmitting and receiving channels A~P. For example, the MMIC $13a$ shown in FIG. 3 is composed of the selective transmission amplifier $15a$, the selective reception amplifier $16a$, and the mixer $17a$ which belong to the transmitting and receiving assembly of the transmitting and receiving channel A, and the selective transmission amplifier $15b$, the selective reception amplifier $16b$, and the mixer $17b$ which belong to the transmitting and receiving assembly of the transmitting and receiving channel B.

The planar array antenna 12a, which is composed of rectangular patches Pa1, Pa2, of the transmitting and receiving channel A is connected to the linear distal end portion of a feeder line FLa, whose proximal end portion is divided into a transmission end portion TXOUT and a reception end portion RXIN by the circulator 14a. The rectangular patches Pa1, Pa2 are spaced a certain distance along the linear distal end portion of the feeder line FLa. The transmission end portion TXOUT separated by the circulator 14a is connected through the selective transmission amplifier 15a to an input terminal TXIN of the MMIC 13a for receiving an FM signal from the FM signal generator 23. The reception end portion RXIN separated by the circulator 14a is connected to an input terminal, i.e., a received signal input terminal, of the mixer 17a. The other input terminal, i.e., a local oscillator input terminal, of the mixer 17a is selectively supplied with an FM signal from the input terminal TXIN through the selective reception amplifier 16a.

Similarly, the planar array antenna 12b, which is composed of rectangular patches Pb1, Pb2, of the transmitting and receiving channel B is connected to the linear distal end portion of a feeder line FLb, whose proximal end portion is divided into a transmission end portion TXOUT and a reception end portion RXIN by the circulator 14b. The transmission end portion TXOUT separated by the circulator 14b is connected through the selective transmission amplifier 15b to the input terminal TXIN of the MMIC 13a for receiving an FM signal from the FM signal generator 23. The reception end portion RXIN separated by the circulator 14b is connected to an input terminal of the mixer 17b. The other input terminal of the mixer 17b is selectively supplied with an FM signal from the input terminal TXIN through the selective reception amplifier 16b.

The selective transmission amplifiers 15a, 15b and the selective transmission amplifiers 16a, 16b of the transmitting and receiving channels A, B are composed mainly of high-frequency FETs (field-effect transistors). These four selective amplifiers 15a, 15b, 16a, 16b intermittently amplify supplied input signals in response to respective intermittent drain voltages Vd1~Vd4 selectively supplied from the channel controller 22 of the main radar circuit 20. The four selective amplifiers 15a, 15b, 16a, 16b are also supplied with a constant gate voltage Vg.

DC magnetic fields in mutually opposite directions are applied to the circulators 14a, 14b, respectively, for rotating signals in mutually opposite directions in the circulators 14a, 14b. The application of DC magnetic fields in mutually opposite directions to the circulators 14a, 14b is effective to cancel those DC magnetic fields and prevent a DC magnetic field from being generated.

Figure 4:
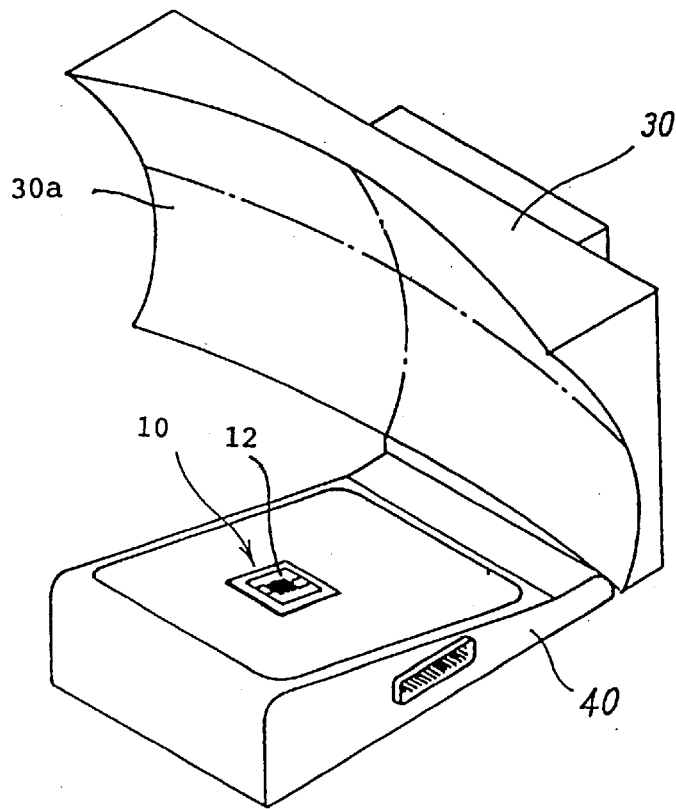
FIG. 4 is a perspective view of a FM radar system which incorporates the FM radar module shown in FIG. 1.

FIG. 4 illustrates in perspective an FM radar system which incorporates the FM radar module 10 shown in FIG. 1. As shown in FIG. 4, the FM radar module 10 is housed in a metallic holder 40 and integrally combined with a secondary radiator 30 by the metallic holder 40, with the antenna assembly 12 serving as a primary radiator. The secondary radiator 30 has a parabolic reflecting surface 30a, and the antenna assembly 12 composed of the 16 planar array antenna elements 12a~12p is positioned in the vicinity of the focal point of the parabolic reflecting surface 30a. FM signals in a millimeter wavelength range which are radiated from the respective planar array antenna elements 12a~12p are reflected by the parabolic reflecting surface 30a and radiated at respective different angles or bearings in a horizontal direction forwardly of the secondary radiator 30. The primary radiator composed of the antenna assembly 12 and the secondary radiator 30 jointly make up an offset multiple-beam parabolic antenna.

Figure 6:
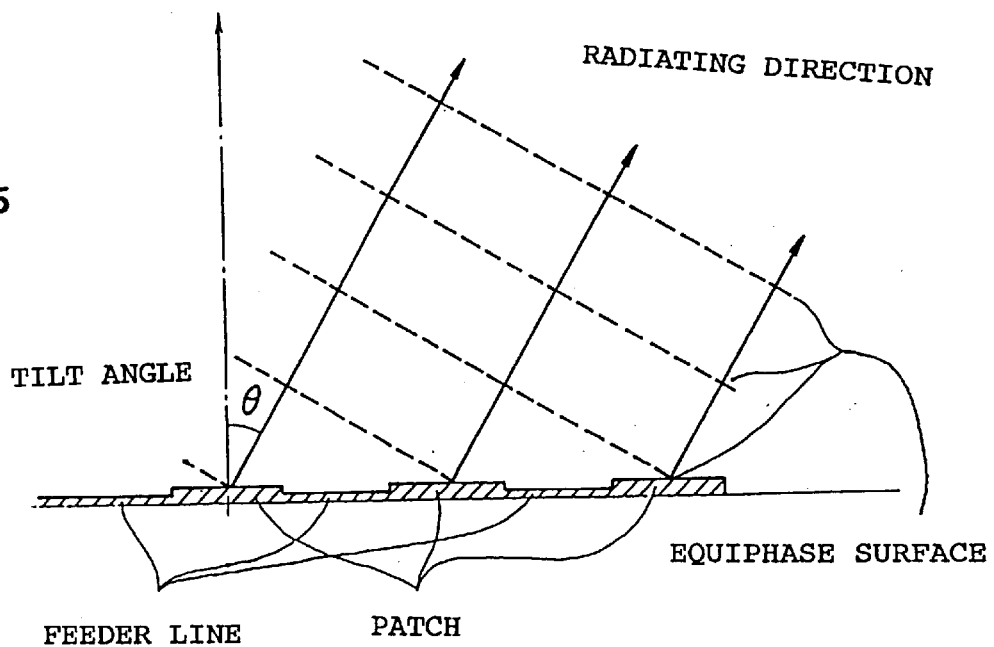
FIG. 6 is a diagram illustrative of a tilt angle of planar array antenna elements of the FM radar module shown in FIG. 2.

In each of the planar array antenna elements 12a~12p, the two rectangular patches are spaced a certain distance from each other along the linear distal end portion of the feeder line. Electromagnetic waves are radiated at a certain tilt angle from the respective planar array antenna elements 12a~12p. Specifically, as shown in FIG. 6, the direction (indicated by the solid lines) in which the electromagnetic waves are radiated from the respective patches is inclined at a tilt angle relative to a line (indicated as the dot-and-dash line) normal to the dielectric substrate 11 such that equiphase surfaces (indicated by the dotted lines) of the electromagnetic waves radiated from the respective patches lie perpendicularly to the direction in which they are radiated from the respective patches. The equiphase surfaces of the radiated electromagnetic waves are determined by a delay time which is caused when the signals are propagated through the feeder lines and the electromagnetic waves are propagated through the air.

While the patches are shown thicker than the feeder line in FIG. 6 for distinguishing the patches from the feeder line, they are so shown for illustrative purpose only and are actually of the same thickness. The length of the feeder line portion that interconnects the two patches of each of the eight planar array antenna elements of one group is substantially a half wavelength different from the length of the feeder line portion that interconnects the two patches of each of the eight planar array antenna elements of the other group so that the electromagnetic waves will be radiated from the planar array antenna elements of the two groups at the same angle toward the secondary radiator.

As shown in FIG. 4, since each of the planar array antenna elements 12a~12p radiates the electromagnetic wave at a tilt angle, as described above, the FM radar module 10 which is large in size, when compared with the primary radiator, is effectively prevented from interfering with the electromagnetic waves radiated from the secondary radiator 30. Accordingly, the FM radar module 10 that includes the antenna assembly 12 as the primary radiator can be positioned near the secondary radiator 30. With this arrangement, the FM radar module 10 is allowed to be of an MMIC-based structure which is made up of the MMICs 13a~13h composed of the transmitting and receiving assemblies and the antenna assembly 12 on the dielectric substrate 11.

Referring back to FIG. 1, the FM millimeter-wave signals supplied from the FM signal generator 23 are selectively amplified only in given periods successively by the respective selective transmission amplifiers 15a~15p in the respective transmitting and receiving channels A~P according to channel control signals supplied from the channel controller 22. Each of the selective transmission amplifiers 15a~15p comprises two cascaded FETs and switching transistors for intermittently supplying an operating drain voltage to the FETs according to the channel control signal, and selectively amplifies the FM millimeter-wave signal only in a period in which operating electric energy is supplied thereto.

More specifically, unless a drain voltage is supplied, each of the selective transmission amplifiers 15a~15p imparts a large insertion loss to the FM millimeter-wave signal passing therethrough, virtually separating the FM signal generator 23 and the corresponding one of the circulators 14a~14p. Therefore, each of the selective transmission amplifiers 15a~15p functions as a switch having such a gain for selectively connecting the FM signal generator 23 to and disconnecting the FM signal generator 23 from the corresponding one of the circulators 14a~14p. The FM millimeter-wave signals amplified by the respective selective transmission amplifiers 15a~15p are supplied through the respective circulators 14a~14p to the respective planar array antenna elements 12a~12p, which then radiate the FM millimeter-wave signals as electromagnetic waves away from the dielectric substrate 11 toward the secondary radiator 30 (see FIG. 4). The radiated electromagnetic waves are reflected by the parabolic reflecting surface 30a of the secondary radiator 30 out of the motor vehicle on which the FM radar system is installed.

Some of the FM millimeter-wave signals radiated as electromagnetic waves out of the motor vehicle are reflected by objects, travel back to and are received by the planar array antenna elements 12a~12p. The reflected electromagnetic waves which are received by the planar array antenna elements 12a~12p are separated as FM echo signals from the transmitting channels by the circulators 14a~14p, respectively. The separated FM echo signals are supplied to the respective received signal input terminals of the mixers 17a~17p. The other local oscillator input terminals of the mixers 17a~17p are supplied with amplified FM millimeter-wave signals from the selective reception amplifiers 16a~16p which successively amplify FM millimeter-wave signals intermittently only in given periods according to channel control signals supplied from the channel controller 22. The selective reception amplifiers 16a~16p function as respective switches as was the case with the selective transmission amplifiers 15a~15p.

Beat signals outputted from respective output terminals of the mixers 17a~17p are transmitted through output terminals BTa, BTb to the selector 24. In the selector 24, the beat signals are amplified by respective amplifiers 24a~24b whose amplification factor varies depending on the frequency. The amplifiers 24a~24b are selected in a time-sharing fashion by the channel controller 22 to supply the amplified beat signals through a coaxial cable to the A/D converter 25, which converts the beat signals into digital beat signals. The digital beat signals are then supplied to the FFT circuit 26, and converted thereby into a frequency spectrum that is then supplied to the CPU 21.

Figure 5:
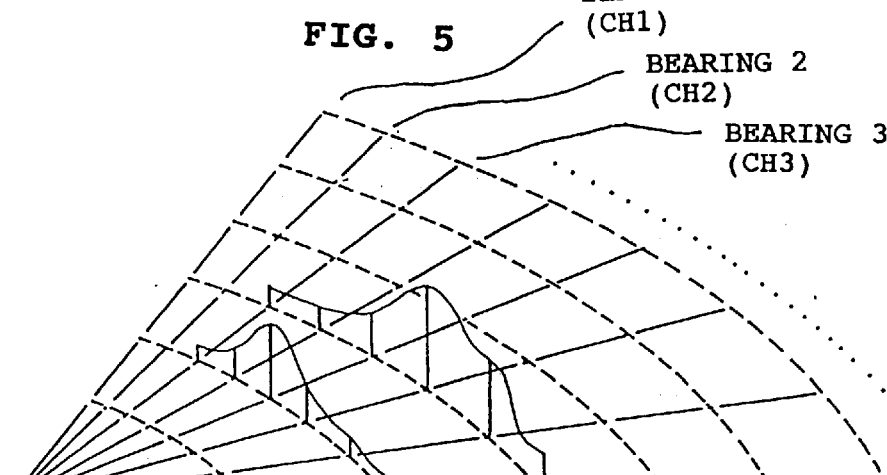
FIG. 5 is a diagram showing distances to echo-generating objects that are detected by the FM radar system which incorporates the FM radar module shown in FIG. 1, together with a distribution of bearings covered by the FM radar system.

The CPU 21 analyzes the frequency spectrum of the received FM echo signals supplied from the FFT circuit 26, and calculates distances to the objects which have produced the FM echo signals in the respective transmitting and receiving channels and hence at respective bearings. Typically, the CPU 21 generates a two-dimensional map of obstacles to the motor vehicle as shown in FIG. 5.

Figure 7:
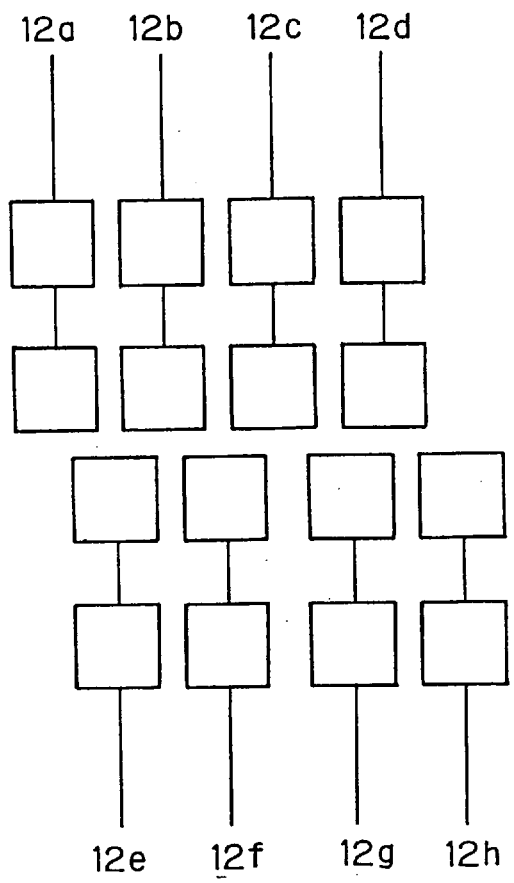
FIG. 7 is a plan view of a pattern of planar array antenna elements of an FM radar module according to another embodiment of the present invention.

FIG. 7 shows in plan a pattern of planar array antenna elements of an FM radar module according to another embodiment of the present invention. In the embodiment shown in FIG. 7, eight planar array antenna elements 12a~12h are divided into a group of four planar array antenna elements 12a~12d and a group of four planar array antenna elements 12e~12h. The four planar array antenna elements 12a~12d of one group and the four planar array antenna elements 12e~12h of the other group are disposed on respective linear distal end portions of feeder lines belonging to the respective groups and extending in opposite directions that are 180° apart from each other. The four planar array antenna elements 12a~12d and the four planar array antenna elements 12e~12h are positioned substantially in an end-to-end configuration, but are staggered with respect to each other in a direction across the feeder lines, i.e., are held out of alignment with each other in a direction along the feeder lines. This arrangement permits the planar array antenna elements to be transversely spaced at relatively small intervals for small antenna size and high bearing resolution.

The present invention has been described above as being embodied as an FM radar module. However, the principles of the present invention are also applicable to any of various other radar modules including an AM radar module, a pulse radar module, etc. Rather than employing the FM signal generator 23 in the main radar circuit 20, a voltage-controlled oscillator of 60 GHz may be mounted in the form of an MMIC on the dielectric substrate 11, or included in each of the MMICs 13a~13h on the dielectric substrate 11 for lower cost and smaller size.

The FM radar module according to the present invention offers the following various advantages: Since the plurality of small-size planar array antenna elements are arrayed so as to be shared by the transmitting and receiving assemblies through the circulators, the number of planar array antenna elements may be increased in a limited installation space, making it possible to scan a relatively large angular range with a scanning beam. The planar array antenna elements serve as a primary radiator in an offset defocused multiple-beam parabolic antenna for wide scanning angular range and high bearing resolution.

Since the planar array antenna elements are combined with the circulators so as to be shared by the transmitting and receiving assemblies, the various components of the antenna assembly 12 are mounted in a high-density configuration. Specifically, the selective transmission and reception amplifiers and the mixers in the form of MMICs are mounted on the single dielectric substrate, making up the antenna assembly 12 serving as the primary radiator. An FM radar system of the scanning type which incorporates the antenna assembly 12 is of a high-density structure, a small size, a low cost, and high resolution, suitable for use on motor vehicles. The FM radar system can be used in a wide range of motor vehicle applications including an active cruise control system, a collision prevention system, etc.

Although certain preferred embodiments of the present invention have been shown and described in detail, it should be understood that various changes and modifications may be made therein without departing from the scope of the appended claims.

What is claimed is:

1. An antenna device comprising:
   a dielectric substrate;
   an array of antenna elements mounted on said dielectric substrate, each of said antenna elements comprising a plurality of patches interconnected in a direction transverse to said array; and
   a plurality of circulators mounted on said dielectric substrate and connected in series to said antenna elements, respectively,
   wherein said circulators are arranged in pairs of adjacent circulators, said circulators in each of the pairs being arranged such that DC magnetic fields in mutually opposite directions are applied to the circulators, respectfully, for rotating signals in mutually opposite directions in the circulators.

2. An antenna device according to claim 1, further comprising a scanning control circuit for switching the antenna elements in a time-sharing fashion.

* * * * *